United States Patent
Sawada

(10) Patent No.: US 6,295,180 B1
(45) Date of Patent: Sep. 25, 2001

(54) DISK DRIVE CAPABLE OF PREVENTING EJECTION OF MAGNETIC RECORDING MEDIUM EVEN UPON ERRONEOUS DEPRESSION OF EJECT BUTTON DURING WORK

(75) Inventor: Toru Sawada, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/406,483

(22) Filed: Sep. 27, 1999

(30) Foreign Application Priority Data

Sep. 30, 1998 (JP) .................................................. 10-294555

(51) Int. Cl.⁷ .................................................. G11B 5/016
(52) U.S. Cl. .......................................................... 360/99.02
(58) Field of Search ............................. 360/99.02, 99.03, 360/99.06, 99.07

(56) References Cited

U.S. PATENT DOCUMENTS 5,237,473 * 8/1993 Yoshida ............................. 360/99.06
5,278,819   1/1994 Shimegi et al. ..................... 369/215

FOREIGN PATENT DOCUMENTS 3-12852 * 1/1991 (JP) ................................... 360/99.06

* cited by examiner

*Primary Examiner*—David Davis
(74) *Attorney, Agent, or Firm*—Brinks Hofer Gilson & Lione

(57) ABSTRACT

A disk drive comprising an upper head holder with has an arm portion extending laterally and placed on an upper plate, a carriage has a carriage lock for stopping longitudinal movements of the carriage, a lift bar is inserted between the arm portion of the upper head holder and the upper plate and is movable between upper, middle and lower stages, a brake portion of a stopper lever comes into engagement with the carriage lock of the carriage to stop longitudinal movements of the carriage, a lower plate lock means locks a backward movement of a lower plate, and a solenoid is interlocked with and actuates the lift bar, the stop lever and the lower plate lock means.

6 Claims, 5 Drawing Sheets

DISK DRIVE CAPABLE OF PREVENTING EJECTION OF MAGNETIC RECORDING MEDIUM EVEN UPON ERRONEOUS DEPRESSION OF EJECT BUTTON DURING WORK

BACKGROUND OF THE INVENTION

1. Field of the Invention

The present invention relates to a disk drive capable of effecting the loading and ejection of a magnetic recording medium smoothly and capable of preventing the recording medium from being ejected even in the event an eject button should be pushed by mistake during operation.

2. Description of the Related Art

A magnetic recording medium, typical of which is a floppy disk, is loaded into a disk drive in the form of a disk cartridge with a thin film-like magnetic disk received in a shell, then the magnetic disk is rotated within the disk drive, and writing and reading of information are performed by means of a magnetic head which is inserted into the shell through a window with shutter formed in the shell. In the disk drive, such a mechanism as schematically shown in FIG. 8 has heretofore been used for the loading and ejection of the magnetic recording medium.

In the conventional disk drive, as shown in FIG. 8, a lower plate 102 and an upper plate 103 are superimposed in this order on a base plate 101. A rotor (not shown) is mounted at a center of the base plate 101 and it comes into engagement with a center hub attached to a magnetic disk of a magnetic recording medium F to rotate the magnetic disk in a certain direction. The lower plate 102 is mounted on the base plate 101 so as to be movable in the longitudinal direction and its central portion is gouged out so that its movement does not obstruct the rotation of the rotor. An eject button 105 is attached to a front edge portion of the lower plate 102. The upper plate 103 is mounted on the lower plate 102 so that it can be moved upward and downward in two stages interlockedly with backward and forward movements of the lower plate by means of a mechanism (not shown). Between the upper plate 103 and the lower plate 102 is formed a gap and the magnetic recording medium F is inserted into the gap through a front inlet opening 104.

A longitudinally extending cutout portion 106 is formed at a center of a rear portion of the upper plate 103, and within this cutout portion a carriage 110 with a magnetic head carried thereon extends forward from a rear portion of the substrate. In the carriage 110, two head holders 112a and 112b, which are superimposed one on the other, extend forward from a carriage body 111, and magnetic heads are attached respectively to front ends of the head holders, the magnetic heads being opposed to each other with the magnetic recording medium therebetween. Of both head holders, the upper head holder 112a is pivotally movable through a hinge 113 and is urged downward by means of a spring (not shown) The upper head holder 112a has a pair of transversely extending arm portions 114. The arm portions 114 extend beyond the cutout portion 106 and are superimposed on the upper plate 103.

In the above prior art, the carriage 110 can be moved in the longitudinal direction along a guide rail 116 by means of a drive unit 115 which as a whole is constituted by a combination of a worm shaft 115a and a pulse motor 115b, the pulse motor 115b being controlled by a computer.

When the magnetic recording medium F is not inserted into the disk drive, the lower plate 102 assumes a rear position and the upper plate 103 is held at its upper-stage position by a lift lock mechanism (not shown), whereby the gap between the upper and lower plates is widened, permitting the magnetic recording medium F to be inserted freely into the gap. At this time, the upper head holder 112a is raised together with the upper plate 103 by means of its arm portions 114, so that the upper head holder 112a is open upward and does not obstruct the insertion of the recording medium F.

An eject lock mechanism 120 is provided at a right-hand rear position in the figure of the base plate 101. Upon insertion of the magnetic recording medium F and abutment of its tip against a shutter opening/closing lever 122 of the eject lock mechanism 120, the lever 122 slides on an edge portion of the recording medium F and opens a shutter S, allowing the magnetic disk to be exposed. At the same time, a lift lock lever 121, which is interlocked with the shutter opening/closing lever 122, operates to move the lower plate 102 forward so that the upper plate 103, which is interlocked with the lower plate, moves down to its lower stage. Consequently, the recording medium F is held between the lower plate 102 and the upper plate 103 and is fixed thereby. The upper head holder 112a also moves down, so that the upper and lower magnetic heads come into a state of pseudo-contact with the magnetic disk, thus assuming a stand-by state for write and read (work).

When the eject button 105 is pushed upon completion of the work, the lower plate 102 moves backward and pushes the lift lock lever 121 and is thereby locked at a rear position. As a result, the upper plate 103 moves to its upper stage together with the upper head holder 112a. At the same time, the shutter opening/closing lever 122 interlocked with the lift lock lever 121 closes the shutter S and the magnetic recording medium F is caused to spring out forward by virtue of a spring (not shown).

The above conventional loading and ejection mechanism involves a problem that, if the eject button 105 should be pushed by mistake during work, the magnetic recording medium F is ejected immediately and the work is interrupted. Moreover, if the supply of electricity is stopped due to, for example, a power failure during work, the upper and lower magnetic heads are left in pseudo-contact with the magnetic disk, so that when the supply of electricity is restarted, the magnetic heads may come into abnormal contact with the magnetic disk and damage the disk. Further, since the vertical movements of the upper plate 103 and the upper head holder 112a are each performed with a repulsive force of a spring, a large shock is induced. Particularly, there has been a problem that when the upper head holder 112a moves down, the magnetic heads strike against and damage the magnetic disk due to a reaction.

Additionally, with the recent increase in capacity of the magnetic recording medium and fine structure of the magnetic head, high accuracy and speed have also come to be required for positioning the magnetic head. Instead of the conventional drive unit 115 constituted by a combination of the worm shaft 115a and the pulse motor 115b, which is shown in FIG. 8, a so-called voice coil motor of linear drive has come to be used, which is provided with a voice coil on the carriage side and a magnet and a yoke on the substrate side and in which the positions of the magnetic heads can be set in the longitudinal direction at high speed and precisely by energizing the voice coil. In this type of a disk drive, the voice coil is not energized and the carriage may move back and forth freely. However, and upon tilting of the disk drive or exertion of an external force, the carriage may crash against a guide rail end, resulting in deformation thereof or damage of the magnetic heads.

SUMMARY OF THE INVENTION

The present invention has been accomplished for solving the above-mentioned problems and therefore it is an object of the invention to provide a disk drive capable of preventing the ejection of a magnetic recording medium even in the event of erroneous depression of an eject button during work, capable of preventing the magnetic recording medium from being damaged by magnetic heads even in the event of a power failure or at the time of loading or ejection of the magnetic recording medium, and further capable of preventing accidental movement of a carriage even when a voice coil is not energized in the form of a voice coil motor.

According to the present invention, for achieving the above-mentioned object, there is provided a disk drive wherein a lower plate and an upper plate are superimposed in this order on a substrate, an upper magnetic head and a lower magnetic head are mounted on the substrate so as to be opposed to each other with a magnetic recording medium therebetween. The magnetic recording medium is inserted between the lower plate and the upper plate, the lower plate being movable back and forth in an inserting direction of the magnetic recording medium. An eject button is attached to a front portion of the lower plate. The upper plate is movable in two upper and lower stages interlockedly with backward movement and forward movement of the lower plate. The magnetic heads are attached respectively to the tips of two upper and lower head holders, the upper and lower head holders being mounted to a longitudinally movable carriage and capable of being opened and closed forward. The upper and lower magnetic heads are capable of performing write and read operations while holding the magnetic recording medium therebetween in a state of pseudo-contact between the magnetic heads and the magnetic recording medium when in the closed position.

The upper head holder are pivotally movable in a generally vertical direction and are biased downward. An arm portion is formed sideways of the upper head holder, the arm portion extending laterally and being placed on the upper plate. The carriage is formed with a carriage lock extending in the longitudinal direction to lock the longitudinal movement of the carriage.

A lift bar, a stop lever, a lower plate lock means, and a solenoid mounted are on the substrate. The lift bar is inserted between the arm portion and the upper plate, extending in the longitudinal direction and being movable in three stages comprising upper, middle and lower stages. The stop lever is formed with a brake portion which comes into engagement with the carriage lock to stop the longitudinal movement of the carriage, the lower plate lock means functioning to lock the backward movement of the lower plate. The solenoid being interlocked with and actuating the lift bar, the stop lever and the lower plate lock means.

Wherein when the disk drive is in a no-load mode with the magnetic recording medium not inserted into the disk drive, the upper plate, the lift bar and the upper head holder lie in their upper-stage positions, the upper and lower magnetic heads are in an open condition, the solenoid is not energized, the stop lever comes into engagement with the carriage lock to lock the longitudinal movement of the carriage, and the lower plate lock means is released.

Wherein when the disk drive is in a stand-by mode with the magnetic recording medium inserted into the disk drive and in which write and read operations are not performed, the upper plate moves to its lower-stage position, the lift bar moves to its middle-stage position, and the magnetic head attached to the upper head holder is thereby kept out of contact with the magnetic recording medium in the vicinity of the recording medium.

Wherein when the disk drive is in a work mode in which write and read operations are performed, the solenoid is energized so that the lift bar moves to its lower-stage position, the upper magnetic head attached to the upper head holder and the lower magnetic head are closed so as to come, into the state of pseudo-contact with the magnetic recording medium, the stop lever and the carriage lock are disengaged from each other, and the lower plate lock means is locked.

Wherein when the disk drive is in an end mode in which write and read operations have ended, the solenoid is de-energized and the stand-by mode is reproduced.

And wherein when the disk drive is in an ejection mode in which an eject button is pushed in the end mode or in the stand-by mode, the lower plate moves backward because the lower plate lock means is released, the upper plate moves to its upper-stage position interlockedly with the backward movement of the lower plate, and upon ejection of the magnetic recording medium, a return is made to the no-load mode.

In the above disk drive, even if a user tries to push the eject button by mistake in the work mode, it is impossible to depress the eject button because in this mode the lower plate lock means is locked by the solenoid, and therefore the magnetic recording medium is not ejected. In the stand-by mode or the end mode, since the lower plate lock means is released, the magnetic recording medium can be ejected upon depression of the eject button, and after the ejection, a return is made to the no-load mode. In the event power should be turned off in the work mode, the solenoid is de-energized and therefore a shift is made to the stand-by mode. In this state, the magnetic recording medium is not ejected unless the eject button is pushed, and the magnetic heads stand by in the vicinity of and out of contact with the recording medium. Therefore, when the supply of electricity is restarted, a shift can be made to the work mode immediately without the magnetic recording medium being damaged by the magnetic heads. Further, in the modes other than the work mode, the lever and the carriage lock are kept engaged with each other, so that there is no fear of an accidental longitudinal movement of the carriage even if the disk drive is of the voice coil motor drive type.

In the above disk drive, preferably, a pivotal member is disposed between the carriage and the solenoid on the substrate, the pivotal member being mounted on a longitudinally extending pivot shaft, disposed so that a pivotal end thereof is attracted by the solenoid, and urged so as to retain a neutral position spaced away from the solenoid, and the lift bar, the stop lever and the lower plate lock means are connected to the pivotal member.

According to this construction, the lift bar, the stop lever and the lower plate lock means can shift to the work mode at a time by a single attracting operation of the solenoid. In the modes other than the work mode, the attraction by the solenoid stops and the pivotal end of the pivotal member returns to its neutral position, so that the lift bar, the stop lever and the lower plate lock means can shift at a time to the position of either the stand-by mode or the end mode.

In the above disk drive, preferably, the lift bar is attached to an end portion of a lift bar holding member which extends in an L-shape in section from the shaft portion of the pivotal member.

According to this construction, in the work mode the lift bar can move to its lower-stage position while being attracted by the solenoid, and in the modes other than the work mode it can move upward.

In the above disk drive, preferably, the stop lever has the brake portion at one end thereof and is connected at the opposite end thereof to the substrate pivotably, and a reciprocating lever is provided at an intermediate position between the brake portion and the pivot shaft, an end of the reciprocating lever being connected to the pivotal end of the pivotal member.

According to this construction, in the work mode, the brake portion of the stop lever moves away from the carriage lock of the carriage under the attraction of the solenoid and the carriage becomes movable longitudinally, while in the other modes than the work mode, the brake portion comes into engagement with the carriage lock of the carriage, whereby the longitudinal movement of the carriage can be locked.

In the above disk drive, preferably, the lower plate lock means comprises a block plate which can swing in a lateral plane and a lock end formed on the lower plate and adapted to abut the block plate, the block plate being connected to the pivotal member so as to abut the lock end when the pivotal member is attracted by the solenoid.

According to this construction, in the work mode, the lower plate comes into abutment against the block plate and cannot move backward, thus making it impossible to push the eject button. In the modes other than the work mode, the eject button can be pushed any time to eject the magnetic recording medium because the block plate and the lock end are disengaged from each other.

In the above disk drive, preferably, an electromagnet is mounted on the substrate in parallel with the solenoid, and in the work mode, the solenoid is energized, thereby moving the lift bar to its down-stage position, unlocking the stop lever and locking the lower plate lock means. Thereafter the electromagnet attracts and holds the pivotal member and the solenoid is de-energized.

Since the electromagnet is smaller in power consumption, the saving of electric power can be attained in the work mode.

DETAILED DESCRIPTION OF PREFERRED EMBODIMENTS

Figure 8:
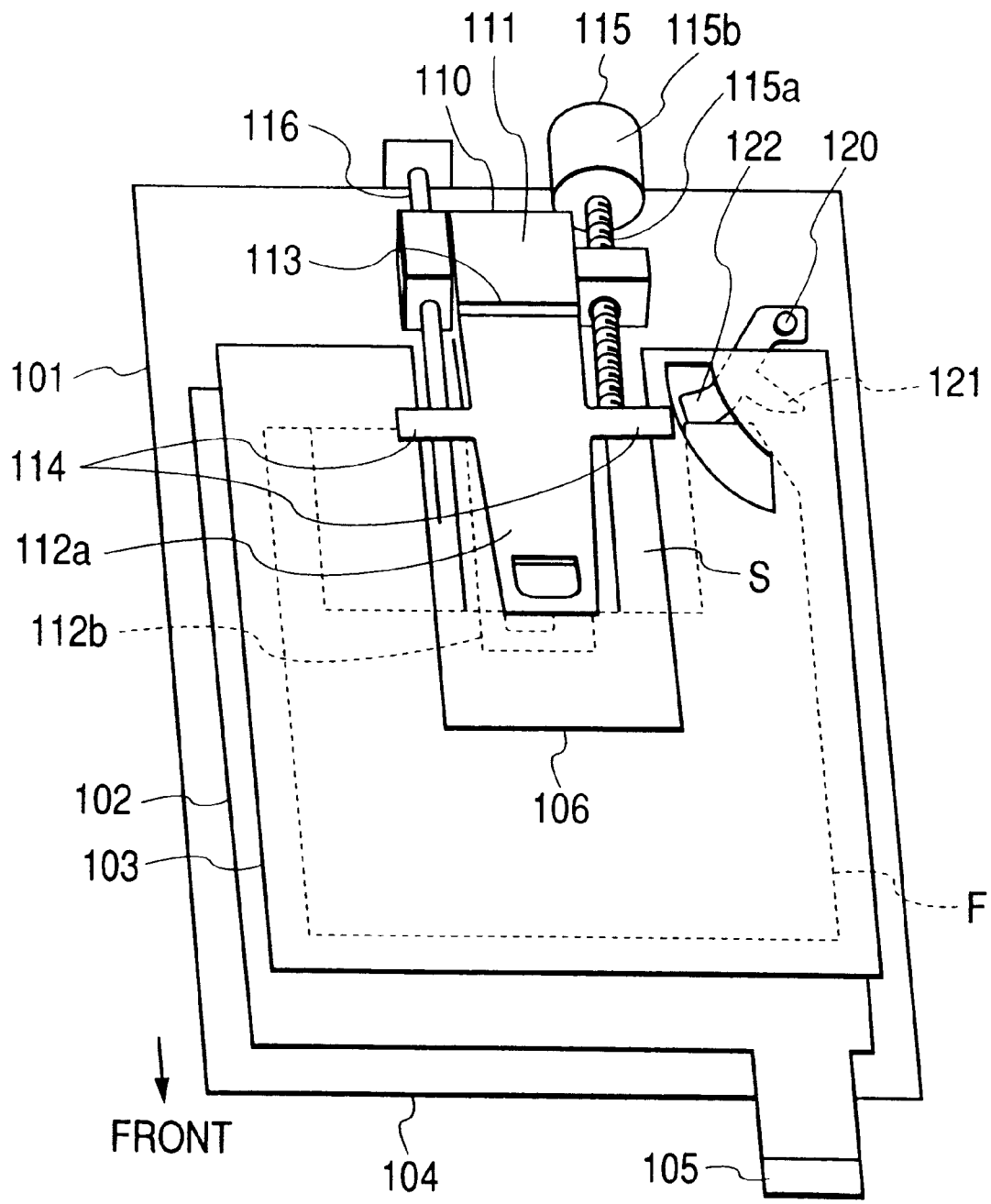
FIG. 8 is a perspective view showing a conventional disk drive schematically.

Embodiments of the present invention will be described hereinunder with reference to the accompanying drawings. In the following description, as to components and operating mechanisms common to the conventional ones described above in connection with FIG. 8, explanations thereof will be omitted or brief.

Referring to FIGS. 1 to 6, there is illustrated a disk drive according to an embodiment of the present invention, in which a lower plate 2 and an upper plate 3 are superimposed in this order on a substrate 1, and a rotor (not shown) is mounted at a center of the substrate 1, the rotor coming into engagement with a center hub of a magnetic recording medium to rotate a magnetic disk in a certain direction The lower plate 2 is movable in the longitudinal direction and its central portion is gouged out so as not to obstruct the rotation of the rotor during movement of the lower plate. An eject button 5 is attached to a front edge portion of the lower plate 2. The upper plate 3 is mounted on the lower plate 2, and through a lock mechanism (not shown), the upper plate 3 is movable in two upper and lower stages in interlock with backward and forward movements of the lower plate 2. When the upper plate 3 is in its upper-stage position, a sufficient gap is formed between the upper plate 3 and the lower plate 2 so that the magnetic recording disk can be inserted into the gap from a front inlet opening.

A cutout portion 6 which extends forward is formed at a central location along the rear portion of the upper plate 3 and the carriage 10 is mounted on the substrate 1 so as to be movable longitudinally within the cutout portion 6. The carriage 10 has a carriage body 12, and two head holders 13a and 13b, which are superimposed one on the other, extend forward from the carriage body 12, with magnetic heads 11a and 11b being attached respectively to the front ends of the head holders 13a and 13b. The magnetic heads 11a and 11b are opposed to each other so as to sandwich the inserted magnetic recording medium therebetween.

Of the two head holders, the upper head holder 13a is pivotable in a vertical direction through a hinge 14, and with pivotal motions of the upper head holder 13a the carriage 10 can be opened and closed. The upper head holder 13a is urged downward at all times by means of a spring 15. The upper head holder 13a has an arm portion 16, the arm portion 16 extending laterally and being placed on the upper plate 3.

The carriage 10 can be moved back and forth along a guide rail 7 within a recording width range of the magnetic disk by means of a drive unit of a voice coil motor type (not shown) which is provided with a voice coil on the carriage side and a magnet and a yoke on the substrate side. By energizing the voice coil, the positions of the magnetic heads 11a and 11b can be set at high speed and precisely in the longitudinal direction. The carriage 10 is sideways formed with a carriage lock 17 which extends in the longitudinal direction and which comprises a train of gears.

Figure 1:
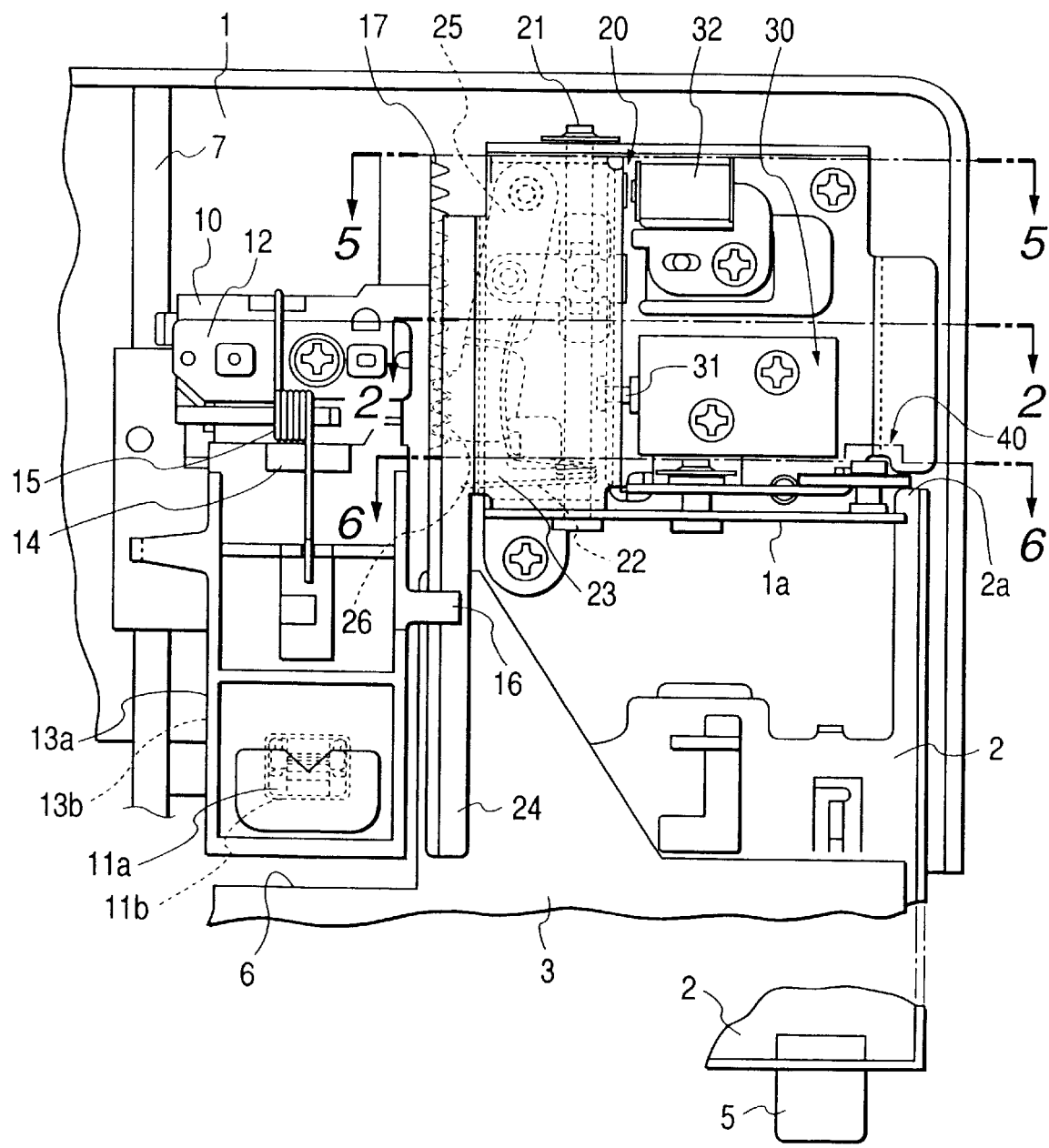
FIG. 1 is a plan view showing a portion of a disk drive according to an embodiment of the present invention.

A pivotal member 20, a solenoid 30 and a lower plate lock member 40 are mounted in this order on the substrate 1 and on the right-hand side of the carriage 10 as shown in FIG. 1.

Figure 2:
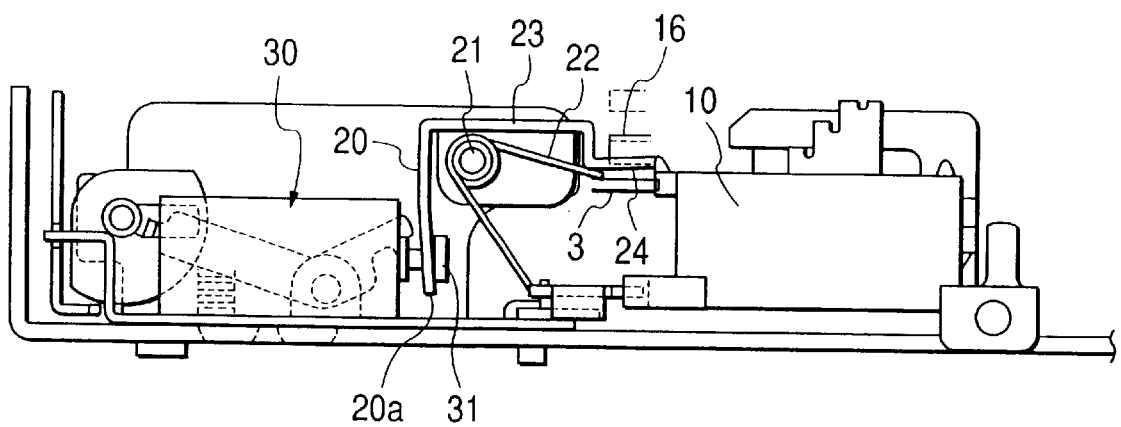
FIG. 2 is a sectional view taken on line 2—2 in FIG. 1.

As shown in FIGS. 1 and 2, the pivotal member 20 is a plate member suspended from a pivot shaft 21 which extends in the longitudinal direction. A pivotal end 20a of the pivotal member 20 is loosely connected to an attracting shaft 31 of the solenoid 30. The pivotal member 20 is urged by a spring 22 so as to be held in a neutral position away from the solenoid 30. Thus, the pivotal member 20 is normally in its neutral position shown in FIG. 2. When the solenoid 30 is energized (turned ON) and the attracting shaft 31 is pulled in, the pivotal member 20 moves pivotally to the solenoid side, while when the solenoid is de-energized (turned OFF), the pivotal member 20 is moved away from the solenoid 30 by means of the spring 22 and reverts to its neutral position.

From the shaft portion of the pivotal member 20 there extends a lift bar holding member 23 in an L-shape section toward the carriage 10, with a lift bar 24 being connected to the tip of the lift bar holding member 23. The lift bar 24 extends in the longitudinal direction along the right-hand side of the carriage 10 shown in the figure while being sandwiched in between the upper plate 3 and the arm portion 16 of the carriage.

The lift bar 24 is interlocked with the pivotal member 20 and can move in three stages, namely, upper, middle and lower stages with rotation of the pivot shaft 21. The upper-stage position of the lift bar 24 is established by being pushed up by the upper plate 3 when the upper plate moves to its upper-stage position. The middle-stage position of the lift bar 24 is established when the upper plate 3 moves to its lower-stage position and when the solenoid 30 is OFF. At this position of the lift bar, the pivotal member 20 is in its neutral position. The lower-stage position of the lift bar 24 is established when the solenoid 30 is ON and when the pivotal member 20 connected to the attracting shaft 31 has tilted to the solenoid side. This position of the pivotal member 20 will hereinafter be referred to as the attracted position.

Figure 3:
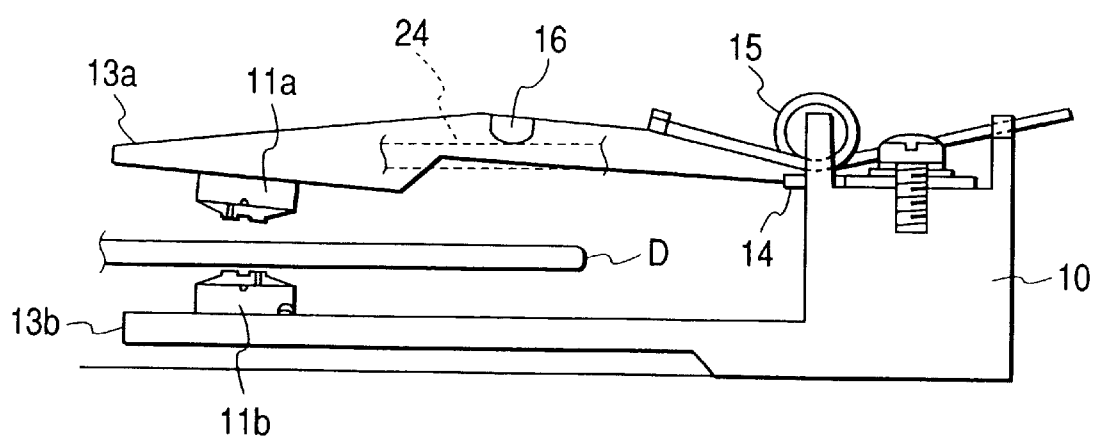
FIG. 3 is a side view of a carriage used in the disk drive.

When the lift bar 24 is at its middle-stage position described above, the arm portion 16 of the upper head holder 13a is placed on the lift bar 24, as shown in FIG. 3, so that in this state the magnetic head 11a is held in the vicinity of and out of contact with a recording disk D of the magnetic recording medium, assuming a stand-by state for work.

Figure 4:
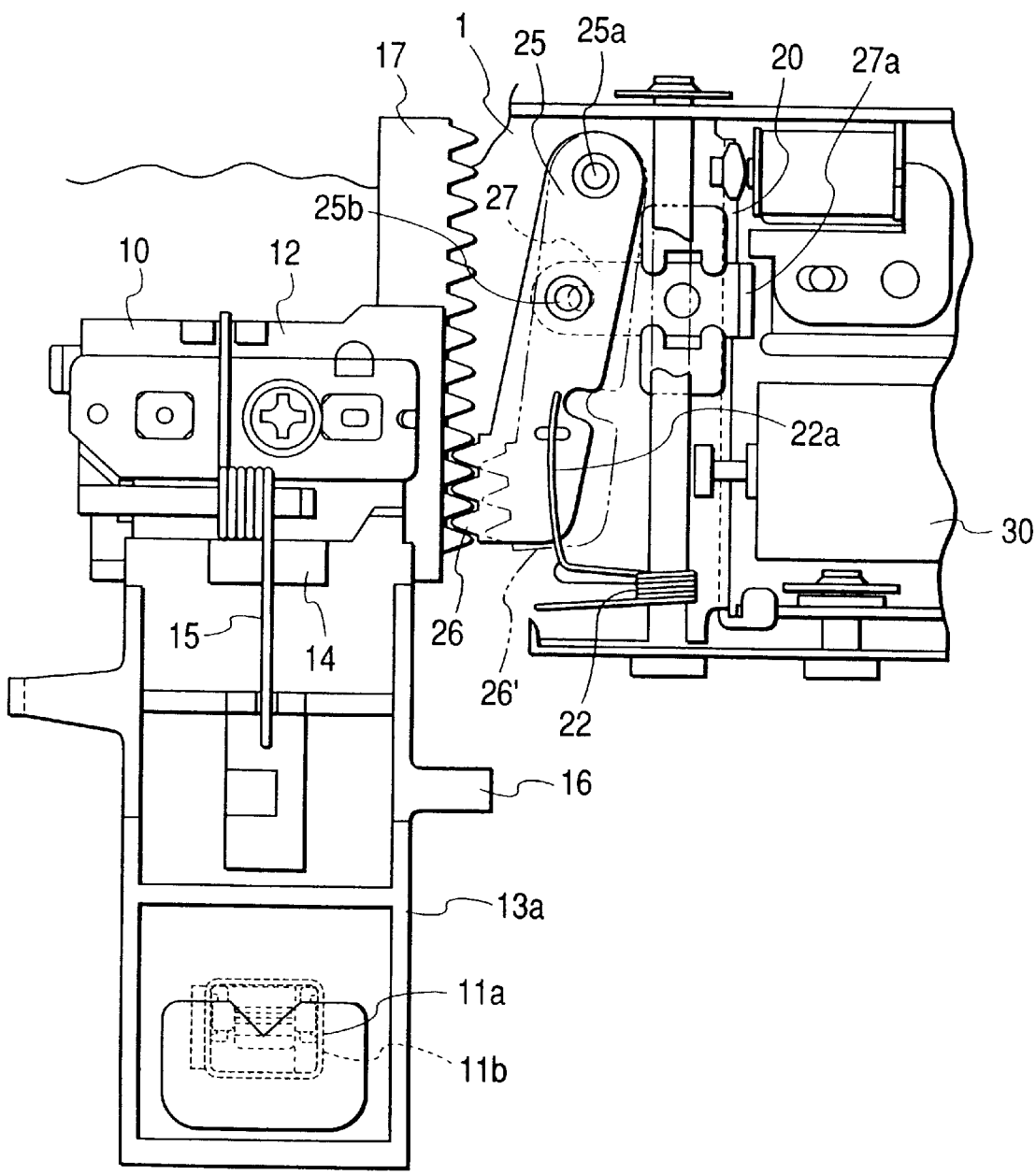
FIG. 4 is a partial plan view of the disk drive.
Figure 5:
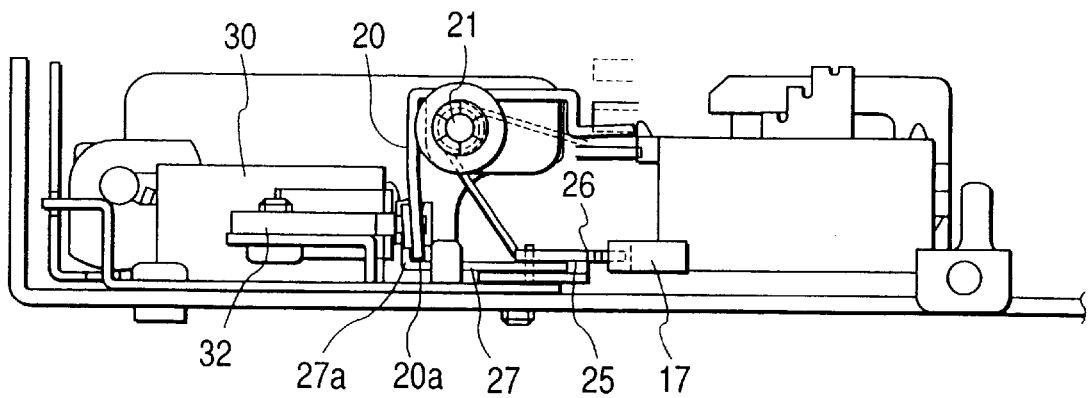
FIG. 5 is a sectional view taken on line 5—5 in FIG. 1.

As shown in FIGS. 4 and 5, a stop lever 25 is secured to the pivotal member 20. The stop lever 25 is provided at one longitudinal end thereof with a tooth-shaped brake portion 26 capable of being engaged with the carriage lock 17 and is connected at the opposite end thereof to the substrate 1 pivotably through a pin 25a. A reciprocating lever 27 is secured pivotably through a pin 25b to the stop lever 25 at a position intermediate between the brake portion 26 and the pin 25a. The opposite end portion, indicated at 27a, of the reciprocating lever 27 is connected to the pivotal end 20a of the pivotal member. An end portion 22a of the spring 22 extends to the stop lever 25 side and urges the brake portion 26 to the carriage lock 17 side so that the brake portion 26 comes into engagement with the carriage lock 17 also when the pivotal member is in its neutral position.

Thus, when the pivotal member 20 is in its neutral position, the brake portion 26 of the stop lever 25 is engaged with the carriage lock 17, while when the solenoid 30 turns ON and the pivotal member 20 assumes its attracted position, the brake portion 26 moves away from the carriage lock 17, as indicated with a dash-double line 26' in FIG. 4, and the carriage 10 is disengaged from the stop lever 25.

Figure 6:
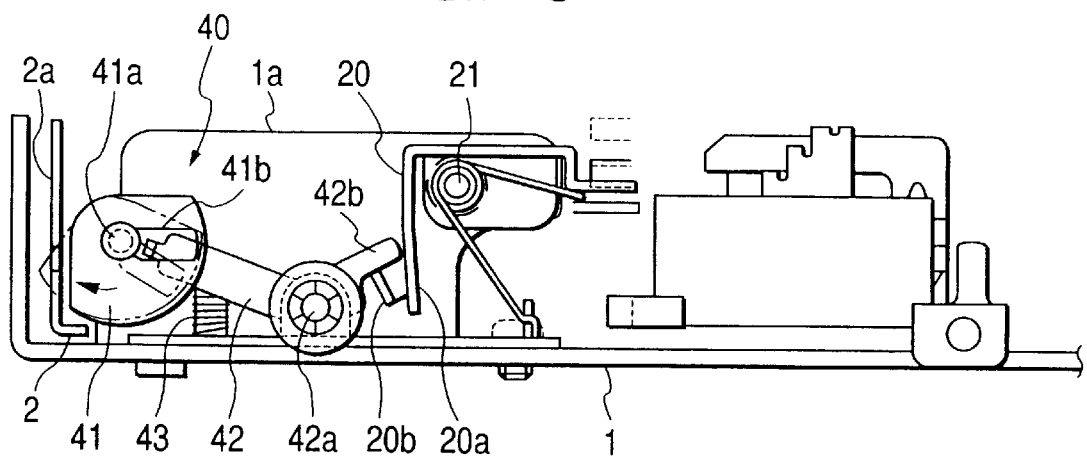
FIG. 6 is a sectional view taken on line 6—6 in FIG. 1.

As shown in FIG. 6, the lower plate lock means 40 comprises a block plate 41 which is pivotable in a lateral plane and a lock end 2a formed on the lower plate 2 so as to abut the block plate 41. The block plate 41 is secured to a lateral plate 1a through a pin 41a so as to be pivotable in a vertical and lateral plane, the lateral plate 1a being erected on the substrate 1. The block plate 41 has a connection hole 41b and is connected to one end portion of a interlocking lever 42 which is engaged with the connection hole 41b. The opposite end of the interlocking member 41 is engaged with a receiving member 20b provided at the pivotal end 20a of the pivotal member. The interlocking lever 42 is a plate member formed in a generally V shape, with the bent point thereof being secured to the lateral plate 1a pivotably through a pin 42a.

When the pivotal member 20 is in its neutral position, the block plate 41 of the lower plate lock means 40 is not in abutment against the lock end 2a of the lower plate, so that the lower plate 2 can move backward. When the pivotal member 20 assumes its attracted position, the block plate 41 turns clockwise into abutment against the lock end 2a to block the backward movement of the lower plate 2. A spring 43 is secured to the interlocking lever 42, whereby when the solenoid 30 is de-energized, the block plate 41 is turned counterclockwise and is unlocked thereby.

An electromagnet 32 is mounted on the substrate 1 in parallel with the solenoid 30, as shown in FIG. 1. A ferromagnetic material is attached to the portion of the pivotal member 20 which portion is opposed to the electromagnet 32. Accordingly, when the electromagnet 32 is energized, the pivotal member 20 is attracted electromagnetically and is held at its attracted position. The supply of electricity to the solenoid 30 and the electromagnet 32 is controlled in a successive manner by means of a computer. More specifically, first the solenoid is energized, subsequently the electromagnet is energized, and just after the start of energization of the electromagnet, the solenoid is turned OFF.

The disk drive of this embodiment operates in the following manner as shown in Table 1.

TABLE 1

| Mode | ① No-load | ② Stand-by | ③ Work | ④ End | ⑤ Ejection |
|---|---|---|---|---|---|
| Lower plate 2 | Rear | Front | ← | Front | Rear |
| Upper plate 3 | Up | Down | ← | Down | Up |
| Solenoid 30 | Off | ← | On/off | Off | ← |
| Electromagnet 32 | Off | ← | Off/on | off | ← |
| Lift bar 24 | Up | Middle | Down | Middle | Up |
| Magnetic head 11a | Open | Stand-by | Work | Stand-by | Open |
| Carriage 10 | Lock | ← | Release | Lock | ← |
| Lower plate lock means 40 | Release | ← | Lock | Release | ← |
| Ejection (Eject button 5) | — | Feasible | Infeasible | Feasible | — |

① No-load Mode
A state in which the magnetic recording medium is not loaded into the disk drive:

The upper plate 3 is in its upper-stage position and a space for insertion therein of the magnetic recording medium is formed between the lower plate 2 and the upper plate 3. At this time, the arm portion 16 placed on the upper plate 2 through the lift bar 24 is in its upper-stage position, so that the front portion of the upper head holder 11a rises and the magnetic head 11a is in an open condition, thus permitting insertion of the magnetic recording medium.

Since the solenoid 30 and the electromagnet 32 are turned OFF and the lift bar 24 is in its upper-stage position together with the arm portion 16, the pivotal member 20 tilts to the carriage 10 side and the stop lever 25 comes into engagement with the carriage lock 17 to lock the longitudinal movement of the carriage 10. The lower plate lock means 40 is released, but the lower plate 2 has already been locked backward by the same mechanism as the associated conventional mechanism (not shown), so that the eject button 5 is also pulled back and incapable of being pushed.

② Stand-by Mode
A state in which the magnetic recording medium has been loaded and work is not started yet:

Upon loading of the magnetic recording medium, the lower plate 2 (and the eject button 5) moves forward by the same mechanism as the associated conventional mechanism (not shown), and interlockedly with this movement the upper plate 3 moves to its down-stage position to pinch the recording medium in cooperation with the lower plate 2. At the same time, the shutter is opened to expose the magnetic disk D between the magnetic heads 11a and 11b (FIG. 3).

At this time, the solenoid 30 and the electromagnet 32 are OFF and as a result of the upper plate 3 having moved to its lower-stage position the pivotal member 20 is turned to its neutral position by the spring 22, further, the lift bar 24 and the arm portion 16 move to their middle-stage positions. Consequently, the magnetic head 11a is held near and out of contact with the magnetic recording medium and assumes a stand-by state. Even when the pivotal member 20 turns to its neutral position, the stop lever 25 remains engaged with the carriage lock 17 because it is pushed by the spring 22, and the longitudinal movement of the carriage 10 is locked.

At this time, the lower plate lock means 40 is released because the pivotal member 20 is in its neutral position. Consequently, upon depression of the eject button 5, the lower plate 2 is moved backward by the same mechanism as the associated conventional mechanism, the upper plate 3 rises, the magnetic recording medium is ejected, and a return is made to the no-load mode ①.

③ Work Mode

A state in which work (write/read) is being performed:

When a work is started, the solenoid 30 turns ON in accordance with a command issued from the computer and the pivotal member 30 is attracted to its attracted position by the solenoid. As a result, the lift bar 24 and the arm portion 16 move to their lower-stage positions and the magnetic head 11a comes into a state of pseudo-contact with the magnetic recording medium, now ready for write and read. Further, the stop lever 25 and the carriage lock 17 become disengaged from each other, and the carriage 10 becomes movable back and forth in accordance with a command issued from the computer. At this time, the lower plate lock means 40 is locked, so that the eject button 5 cannot be pushed in and it is impossible to eject the magnetic recording medium.

After the solenoid 30 turns ON and the pivotal member 30 assumes its attracted position, the attracting action for the pivotal member 30 is taken over by the electromagnetic 32 which operates with a lower electric power, and the solenoid 30 turns OFF. Thus, the subsequent work mode can be maintained at a low electric power.

In this work mode ③, if the supply of electricity should be stopped due to a power failure for example, the pivotal member 30 returns to its neutral position and a shift is made to the stand-by mode ②. After the supply of electricity is re-started, if the computer is turned ON, a shift is made again to the work mode ③.

④ End Mode

A state in which the computer has issued an end command:

In this case, both the solenoid 30 and the electromagnet 32 are turned OFF and the pivotal member 30 reverts to its neutral position, so that the present mode is the same as the stand-by mode ②. Consequently, the magnetic head 11a assumes a stand-by state, the longitudinal movement of the carriage 10 is locked, and it becomes possible to push the eject button 5.

⑤ Eject Mode

A pushed state of the eject button 5:

In the end mode ④ or the stand-by mode ②, the magnetic recording medium has been loaded, the lower plate 3 is in its front position, and the lower plate lock means 40 is released, so that when the eject button 5 is pushed, the lower plate 2 is moved backward and locked by the same mechanism as the associated conventional mechanism (not shown). Interlockedly with this movement the upper plate 3 moves to its upper-stage position, the shutter of the magnetic recording medium is closed, the recording medium is ejected by virtue of the spring, and a return is made to the no-load mode ①.

Figure 7:
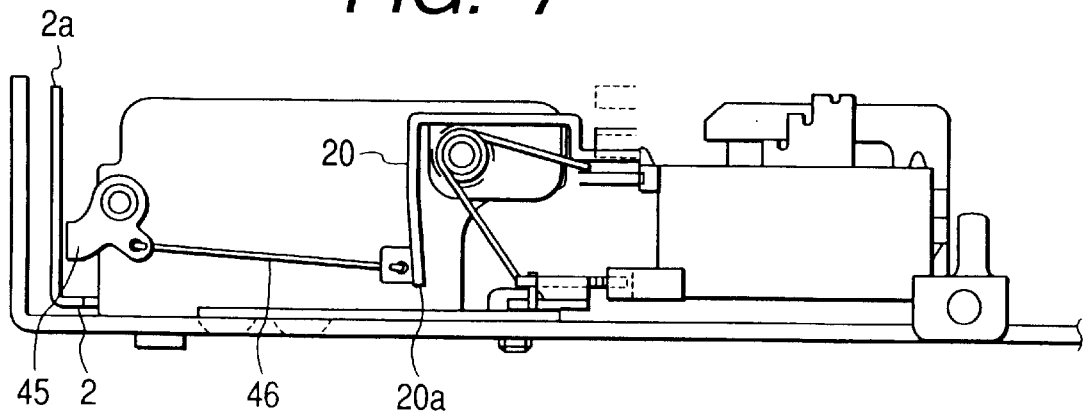
FIG. 7 is a partial sectional view of a disk drive according to another embodiment of the present invention.

It goes without saying that in the disk drive of the present invention the mechanisms of various components are not limited to those described in the above embodiment. For example, in the carriage lock 17 and the brake portion 26, rubber or felt, which are high in frictional resistance, may be used instead of the gear trains. As to the solenoid 30 and/or the electromagnet 32, a ratchet mechanism or the like may be used for attracting the pivotal member 20, whereby it is only at the time of start and end of work that the supply of electricity is required, the power can be kept OFF during work, and thus a further saving of electric power can be attained. The lower plate lock means 40 may be constructed as in FIG. 7, in which a block plate 45 pivotable in a lateral plane and the pivotal end 20a of the pivotal member are connected with each other through a connecting rod 46.

What is claimed is:

1. A disk drive comprising:

a lower plate and an upper plate are superimposed in this order on a substrate, an upper magnetic head and a lower magnetic head are mounted on said substrate so as to be opposed to each other with a magnetic recording medium therebetween, said magnetic recording medium being inserted between said lower plate and said upper plate, said lower plate being movable back and forth in an inserting direction of the magnetic recording medium, an eject button attached to a front portion of the lower plate, said upper plate being movable in two upper and lower stages interlockedly with backward and forward movements of the lower plate, said magnetic heads being attached respectively to two upper and lower head holders;

said upper and lower head holders being mounted to a longitudinally movable carriage and capable of being opened and closed, said upper and lower magnetic heads capable of performing write and read operations while holding said magnetic recording medium therebetween in a state of pseudo-contact between the magnetic heads and the magnetic recording medium when in the closed position;

said upper head holder being pivotally movable in a generally vertical direction and being biased downward, an arm portion being formed sideways of the upper head holder, said arm portion extending laterally and being placed on said upper plate;

said carriage being formed with a carriage lock extending in the longitudinal direction to lock the longitudinal movement of the carriage;

a lift bar, a stop lever, a lower plate lock means, and a solenoid mounted on the substrate, said lift bar being inserted between said arm portion and said upper plate, extending in the longitudinal direction and being movable in three stages comprising upper, middle and lower stages, said stop lever being formed with a brake portion which comes into engagement with said carriage lock to stop the longitudinal movement of the carriage, said lower plate lock means functioning to lock the backward movement of said lower plate, said solenoid being interlocked with and actuating said lift bar, said stop lever and said lower plate lock means;

wherein when said disk drive is in a no-load mode with the magnetic recording medium not inserted into the disk drive, said upper plate, said lift bar and said upper head holder lie in their upper-stage positions, said upper and lower magnetic heads are in an open condition, said solenoid is not energized, said stop lever comes into engagement with said carriage lock to lock the longitudinal movement of said carriage, and said lower plate lock means is released;

wherein when said disk drive is in a stand-by mode with said magnetic recording medium inserted into the disk drive and in which write and read operations are not performed, said upper plate moves to the upper plate lower-stage position, said lift bar moves to the lift bar middle-stage position, and said magnetic head attached to said upper head holder is thereby kept out of contact with the magnetic recording medium in the vicinity of the recording medium;

wherein when said disk drive is in a work mode in which write and read operations are performed, said solenoid is energized so that said lift bar moves to the lift bar lower-stage position, said upper magnetic head attached to said upper head holder and said lower magnetic head are closed so as to come into the state of pseudo-contact with said magnetic recording medium, said stop lever and said carriage lock are disengaged from each other, and said lower plate lock means is locked;

wherein when said disk drive is in an end mode in which write and read operations have ended, said solenoid is de-energized and said stand-by mode is reproduced; and wherein when said disk drive is in an ejection mode in which an eject button is pushed in said end mode or in said stand-by mode, said lower plate moves backward because said lower plate lock means is released, said upper plate moves to its upper-stage position interlockedly with the backward movement of the lower plate, and upon ejection of the magnetic recording medium, a return is made to said no-load mode.

2. A disk drive according to claim 1, wherein a pivotal member is disposed between said carriage and said solenoid on said substrate, said pivotal member being mounted on a longitudinally extending pivot shaft, disposed so that a pivotal end thereof is attracted by said solenoid, and urged so as to retain a neutral position spaced away from the solenoid, and said lift bar, said stop lever and said lower plate lock means are connected to said pivotal member.

3. A disk drive according to claim 2, wherein said lift bar is attached to an end portion of a lift bar holding member which extends in an L-shape in section from the shaft portion of the pivotal member.

4. A disk drive according to claim 2, wherein said stop lever has said brake portion at one end thereof and is connected at the opposite end thereof to said substrate pivotably, and a reciprocating lever is provided at an intermediate position between said brake portion and said pivot shaft, an end of said reciprocating lever being connected to the pivotal end of said pivotal member.

5. A disk drive according to claim 2, wherein said lower plate lock means comprises a block plate which can swing in a lateral plane and a lock end formed on said lower plate and adapted to abut said block plate, said block plate being connected to said pivotal member so as to abut said lock end when the pivotal member is attracted by said solenoid.

6. A disk drive according to claim 2, wherein an electromagnet is mounted on said substrate in parallel with said solenoid, and in said work mode, the solenoid is energized, thereby moving said lift bar to its down-stage position, unlocking said stop lever and locking said lower plate lock means, thereafter, said electromagnet attracts and holds said pivotal member and the solenoid is de-energized.

* * * * *